United States Patent

Park et al.

[11] Patent Number: 5,583,986
[45] Date of Patent: Dec. 10, 1996

[54] APPARATUS FOR AND METHOD OF DUPLEX OPERATION AND MANAGEMENT FOR SIGNALLING MESSAGE EXCHANGE NO. 1 SYSTEM

[75] Inventors: Nam H. Park; Hyun J. Oh; Sun H. Yang, all of Yusung-ku, Rep. of Korea

[73] Assignees: Electronics and Telecommunications Research Institute, Daejeon; Korea Telecommunication Authority, Seoul, both of Rep. of Korea

[21] Appl. No.: 479,222

[22] Filed: Jun. 7, 1995

[30] Foreign Application Priority Data

Dec. 21, 1994 [KR] Rep. of Korea ............... 94-35754

[51] Int. Cl.$^6$ ............................................. G06F 11/00
[52] U.S. Cl. ........................ 395/182.08; 395/182.02; 395/185.1
[58] Field of Search .................. 395/182.02, 182.08, 395/182.09, 182.01, 182.11

[56] References Cited

U.S. PATENT DOCUMENTS

| | | | |
|---|---|---|---|
| 3,890,493 | 6/1975 | Burtness et al. | 395/182.09 |
| 4,751,702 | 6/1988 | Beier et al. | 395/182.11 |
| 4,755,995 | 7/1988 | Anderson et al. | 395/183.07 |
| 4,775,976 | 10/1988 | Yokoyama | 395/182.11 |
| 5,079,740 | 1/1992 | Patel et al. | 395/182.08 |
| 5,129,080 | 7/1992 | Smith | 395/575 |
| 5,157,663 | 10/1992 | Major et al. | 395/182.08 |
| 5,164,769 | 11/1992 | Hashimoto et al. | 335/202 |
| 5,187,706 | 2/1993 | Frankel et al. | 395/182.02 |
| 5,303,243 | 4/1994 | Anezaki | 395/182.02 |
| 5,408,464 | 4/1995 | Jurkevich | 395/182.02 |
| 5,426,773 | 6/1995 | Chabanet et al. | 395/182.02 |

OTHER PUBLICATIONS

Muraki et al., "Control Architecture for Next Generation Communication Networks Based on Distributed Databases", IEEE Journal on Selected Areas in Communications, vol. 7, Iss. 3, pp. 418–23. Apr. 1989.

Rajala et al., "Connection Less Packet Data Transmission in the Signalling Network Infrstructure", IEEE 94 Conf. on Universal Personal Communications, pp. 511–515. Sep. 1994.

Manfield et al., "Performance Analysis of SS7 Congestion Controls Under Sustained Overload", IEEE Journal on selected Areas of Communications, vol. 12, Iss. 3 pp. 405–414. Apr. 1994.

Kim et al, "Signalling Network Operations System (Signos) in Korea", Globecom, IEEE, pp. 1144–1148 1989.

*Primary Examiner*—Robert W. Beausoliel, Jr.
*Assistant Examiner*—Joseph E. Palys
*Attorney, Agent, or Firm*—Keck, Mahin & Cate

[57] ABSTRACT

An apparatus for and a method of duplex operation and management for an SMX-1 system, capable of minimizing a failure of the system and ensuring the consistency of data between the contents of database and the data being currently operated by two operation management subsystem modules (OMMs) operated in a fashion that when a failure occurs in one of the OMMs, the other OMM executes the function to be executed by the one OMM. The OMMs are connected to the target system by a highway interface unit and connected to a remote signalling network operations system (SIGNOS) by an X.25 network using a modem, one of the OMMs being in service to execute a management of network resources and a management of states of signalling networks, while the other OMM being standby.

2 Claims, 15 Drawing Sheets

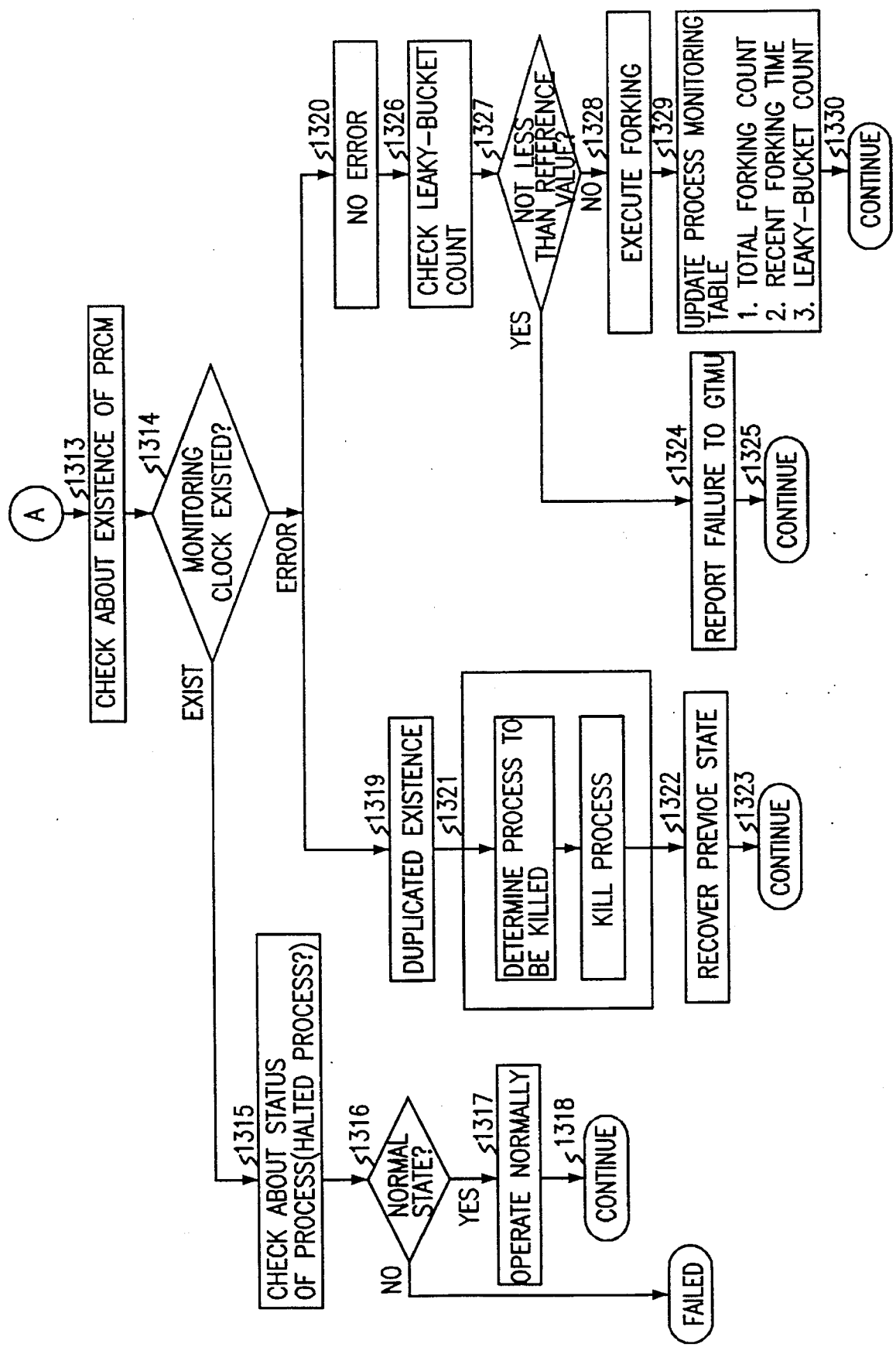

APPARATUS FOR AND METHOD OF DUPLEX OPERATION AND MANAGEMENT FOR SIGNALLING MESSAGE EXCHANGE NO. 1 SYSTEM

BACKGROUND OF THE INVENTION

1. Field of the Invention

The present invention relates to an apparatus for and a method of duplex operation and management for a signalling message exchange No. 1 (SMX-1) system, and more particularly to an apparatus for and a method of duplex operation and management for an SMX-1 system, capable of minimizing a failure of the system and ensuring the consistency of data between the content of database and the data being currently operated by two operation and management subsystems which are equipped in the system and operated in a fashion that when a fault is generated in one of the subsystems, the other subsystem executes the function to be executed by the failed subsystem.

2. Description of the Prior Art

Since SMX-1 systems include generally a single operation and management subsystem, they are hardly applicable in complicated, varied environment requiring functions of establishment, expansion, reduction, system monitoring, error detection and error recovery. Moreover, a fault generated in the operation and management subsystem is spread over the overall SMX-1 system. As a result, it is difficult to satisfy the requirements of signalling message exchange, e.g., performance, functionality and reliability.

SUMMARY OF THE INVENTION

Therefore, the present invention has been made in view of the above-mentioned problems and an object of the invention is to provide an apparatus for and a method of duplex operation and management for an SMX-1 system, capable of minimizing a failure of the system and ensuring the consistency of data between the contents of database and the data being currently operated by two operation and management subsystems which are equipped in the system and operated in a fashion that when a fault is generated in one of the subsystems, the other subsystem executes the function to be executed by the failed subsystem.

In accordance with one aspect, the present invention provides a duplex operation and management apparatus for a signalling message exchange No. 1 system, comprising: a pair of duplicated operation management means both connected to the SMX-1 target system by highway interface unit means and connected to a remote signalling network operations system by transmission and reception means, one of the operation management means being in service to execute a management of network resources and a management of states of signalling networks, while the other operation management means being standby.

In accordance with another aspect, the present invention provides a method for controlling a duplex operation and management subsystem in a signalling message exchange No. 1 system. The subsystem includes a pair of duplicated operation management means both connected to the target system by highway interface unit means and connected to a remote signalling network operations system by transmission and reception means, a first one of the operation management means being in service to execute a management of network resources and a management of states of signalling networks, while the second operation management means being standby, comprising the steps of: (a) starting up the operation and management subsystem being at an idle state when a message for starting up and re-starting up the subsystem is outputted from a worksite, and then determining whether or not the subsystem has started up; (b) transiting the subsystem to a failed state when the startup of the subsystem has been failed at the step (a), while transiting the first operation management means currently being at a normal state to a ready state and transiting the second operation management means to a standby state when the startup of the subsystem has been succeeded; (c) operating the first operation and management means being at the ready state at the step (b) to start up the target system, and then transiting the first operation and management means to an in-service state when the startup of the target system has been succeeded, while transiting the first operation and management means to the ready state again when the startup of the target system has been failed; (d) transiting the first operation and management means being at the in-service state at the step (c) to a failed state when the first operation and management means receives a failure message from a global test and maintenance unit of the target system, while transiting the first operation and management means to a standby state when the first operation and management means receives a state changeover message from the worksite; (e) transiting the second operation and management means being at the standby state at the step (b) to an in-service state when the second operation and management means receives a state changeover message from the global test and maintenance unit of the target system, transiting the second operation and management means to a failed state when a failure is detected by the second operation and management means, and transiting the second operation and management means to the failed state when a changeover failure caused by the second operation and management means occurs, while transiting the second operation and management means to the standby state when a changeover failure caused by the target system occurs; and (f) transiting the subsystem being at the failed state at the step (b) to a standby state when the subsystem receives a failure recovery message from the worksite.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
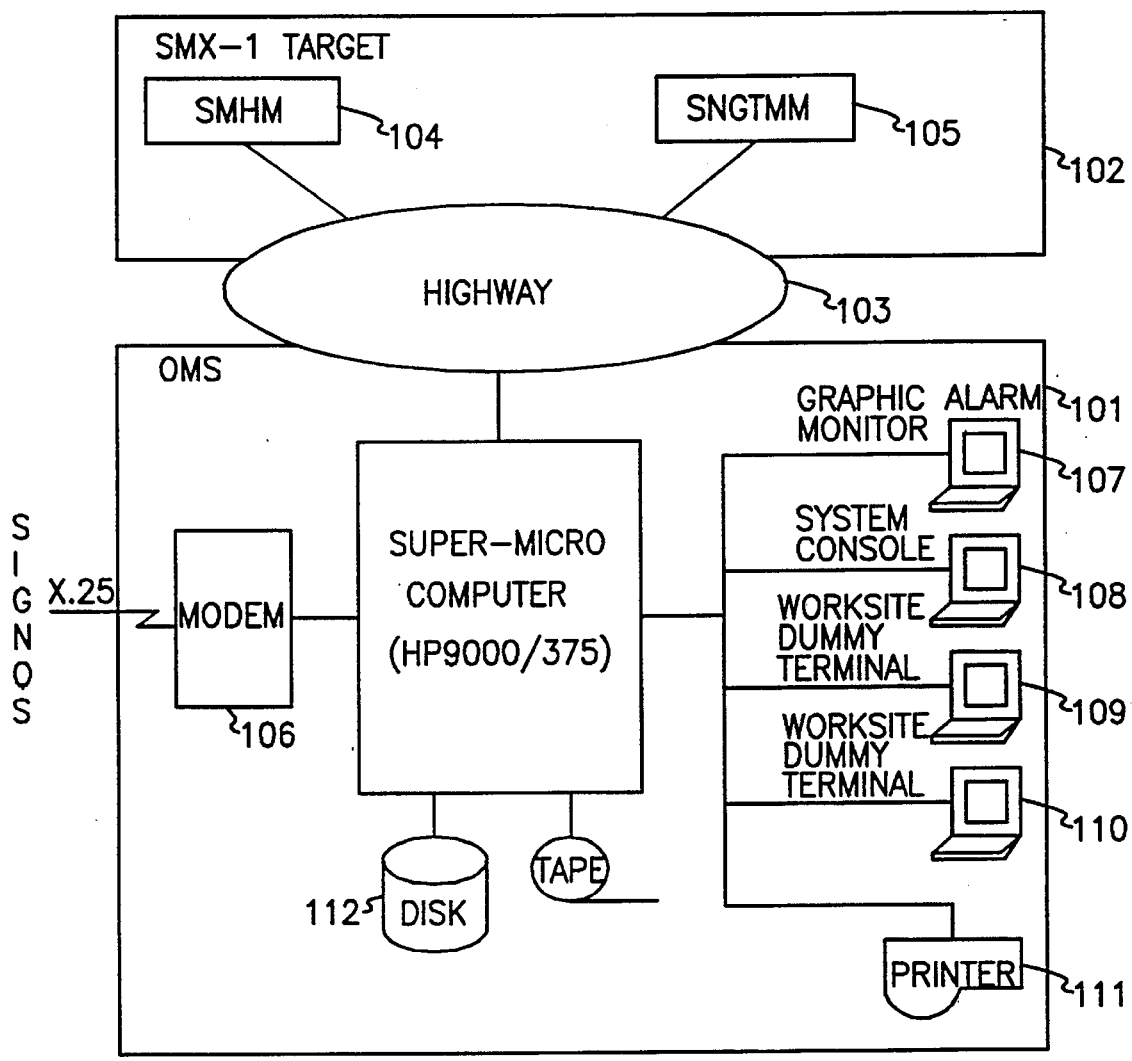
FIG. 1 is a block diagram illustrating the hardware configuration of a system to which the present invention is applied.

FIG. 1 illustrates the hardware configuration of a system to which the present invention is applied. Referring to FIG. 1, an operation and management subsystem (OMS) 101 is shown as being connected to an SMX-1 target system 102 via a subsystems interconnection subsystem 103 referred to as "highway".

The SMX-1 target system 102 consists of a signalling message handling module (SMHM) 104 and a signalling network and global test maintenance module (SNGTMM) 105. The OMS 101 comprises an HP9000/375 system which is a super-micro computer. To this system, several monitors (in the illustrated case, only four monitors 107, 108, 109 and 110 are shown) are connected by means of dummy terminals. Also, a printer 111 is connected to the super-micro computer in order to output messages received from the target system 102. For a signalling network maintenance, the super-micro computer is connected to a signalling network operations system via a modem 106. The OMS 101 utilizes a database 112 called "Allbase" to store and retrieve messages.

Figure 2:
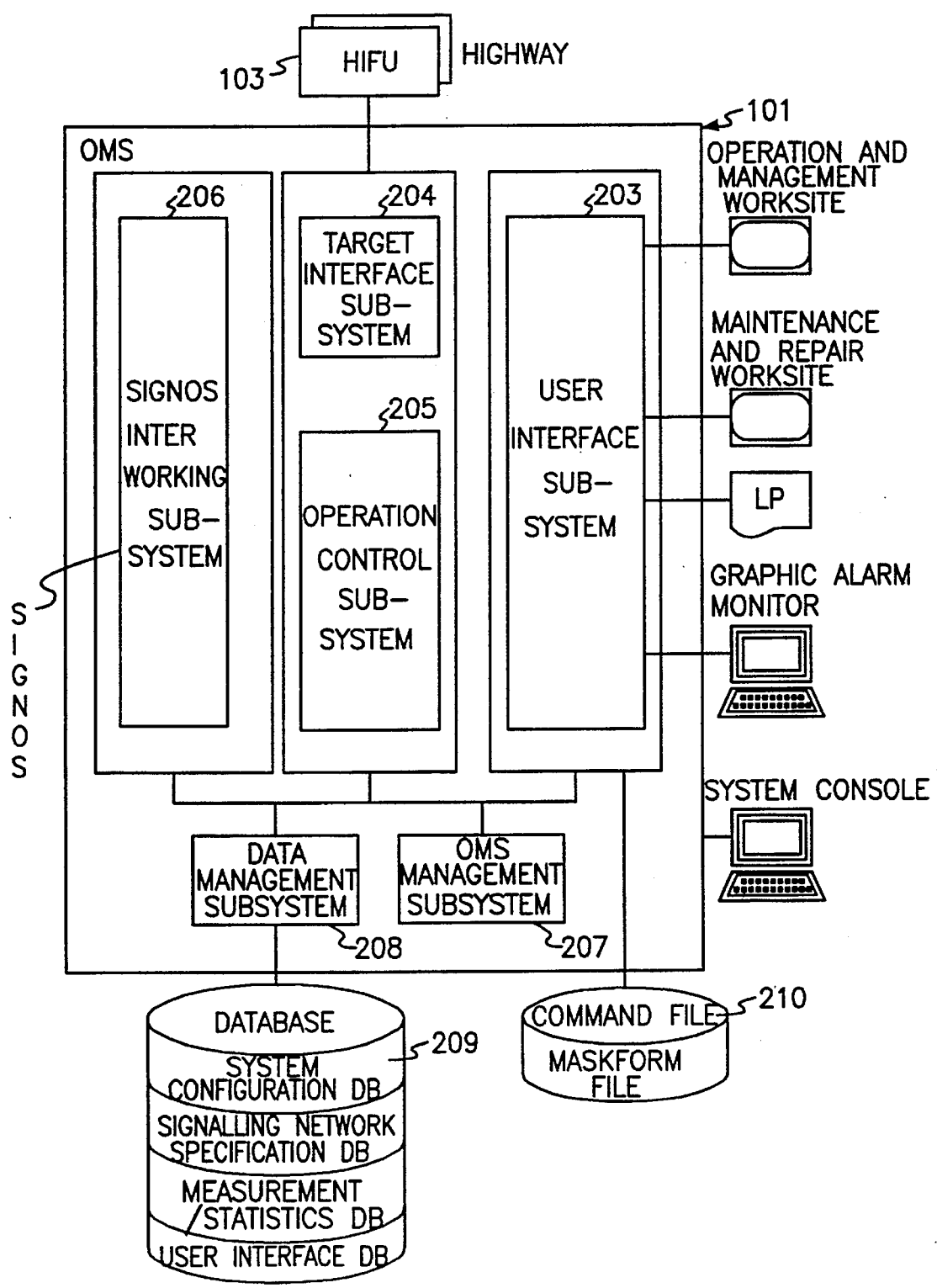
FIG. 2 is a block diagram illustrating detailed configuration of an operation management subsystem (OMS) shown in FIG. 1.

FIG. 2 illustrates detailed configuration of the OMS 101 shown in FIG. 1. The OMS 101, which is connected to the SMX-1 target system via the highway 103, consists of six subsystems, namely, a user interface subsystem 203, a target interface subsystem 204, an operation control subsystem 205, a signalling network operations system (SIGNOS) interworking subsystem 206, an OMS management subsystem 207 and a data management subsystem 208.

The user interface subsystem 203 executes functions for providing the facility to users. That is, the user interface subsystems 203 provides functions associated with operation and management worksites, maintenance and repair worksites, a printer, a graphic alarm monitor and a system console. All input and output commands associated with the user interface subsystem 203 are handled by a command file 210.

The target interface subsystem 204 is connected to the highway 103 by a highway interface unit (HIFU) including HIFU boards HIFU[P] and HIFU[S]. These two groups of HIFU boards HIFU[P] and HIFU[S] are connected to two highway lines, respectively. During the system is in service, the connection of the target interface subsystem 204 to the highway 103 is achieved usually by those HIFU boards HIFU[P]. At this time, the other boards HIFU[S] are at a standby state. Actually, the connection to the highway 103 at a moment is achieved only by one of the HIFU boards HIFU[P]. At the moment that a fault is generated in the system, the connection is switched so that it is achieved by one of the standby HIFU boards HIFU[S].

The operation control subsystem 205 has a function to process, store and handle, in the form of messages compatible with the OMS 101, all commands and messages received from the operation and management worksites and the target interface subsystem 204.

The SIGNOS interworking subsystem 206 serves to support an operative connection of the OMS 101 to a signalling network operations system (SIGNOS). To this end, the SIGNOS interworking subsystem 206 has a function to receive and process commands from the SIGNOS or periodically report system operation results to the SIGNOS.

The OMS management subsystem 207 has a function to manage and administrate all processes, namely, daemon processes and transient processes which exist in the OMS 101. For ensuring an efficient process management, the OMS management subsystem 207 uses an interprocess communications (IPC) mechanism, the message queue system.

Finally, the data management subsystem 208 has a function to store and manage all data associated with the SMX-1 in the form enabling change, retrieval, inputting, outputting and processing thereof for obtaining data requested from users of the OMS 101 and the SIGNOS. The data management subsystem 208 uses a database 209 stored with a variety of data about system configuration, signalling network specification, measurement/statistics and user interface.

Figure 3:
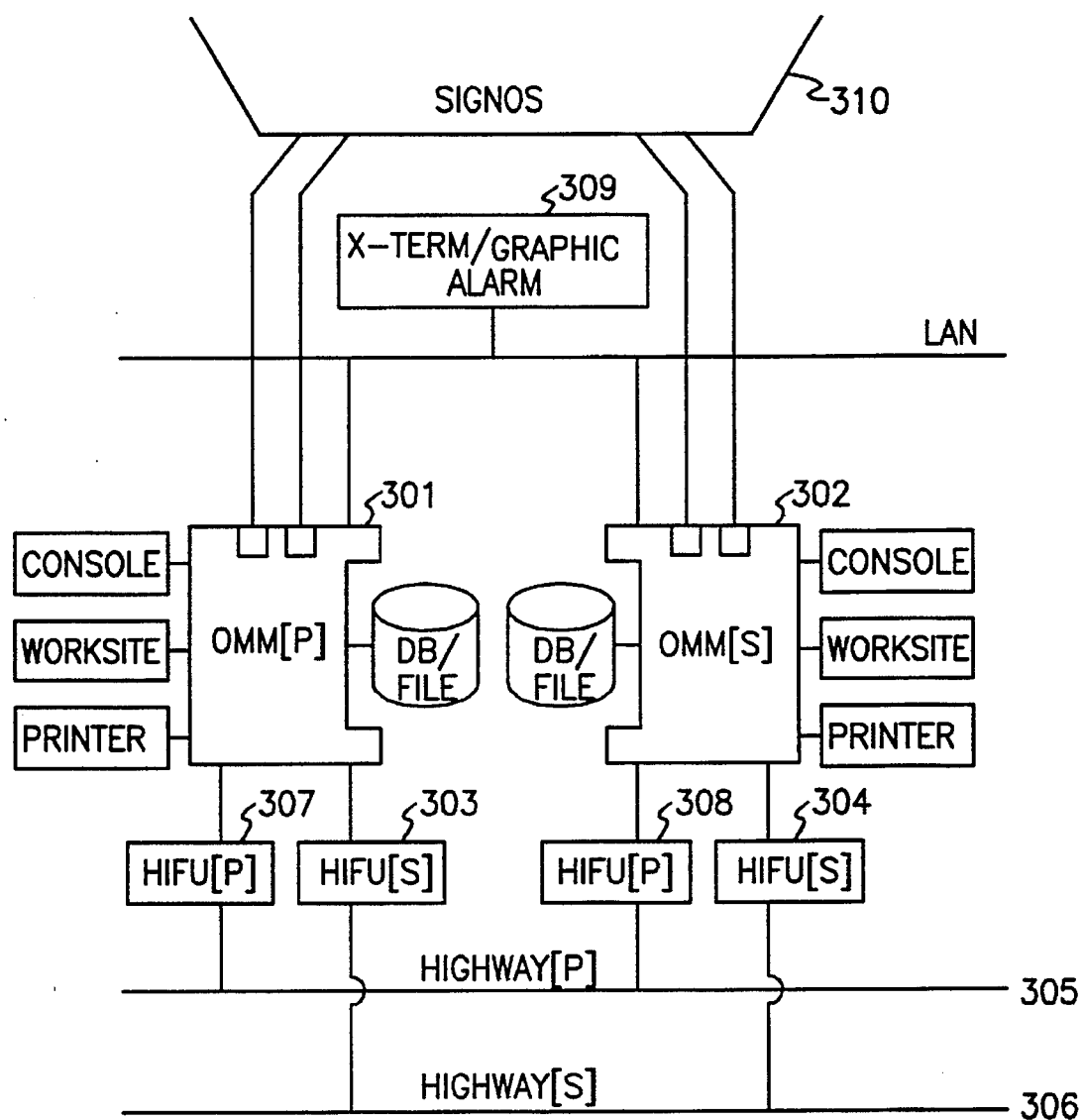
FIG. 3 illustrates the configuration of a duplex OMS in accordance with the present invention.

FIG. 3 illustrates the configuration of a duplex OMS in accordance with the present invention.

Referring to FIG. 3, two OMS modules (OMM) 301 and 302 are shown which are connected to a target system., namely, an SMX-1 system. During an operation of the system, only one of the OMMs, namely, the OMM 301 is in service (OMM[P]), while the other OMM 302 is at a standby state (OMM[S]). To the OMM[P] 301, a pair of HIFU boards 303 and 307 are connected for the connection to the target system. During the OMM[P]301 is in service, only one of the HIFU boards, namely, the HIFU board 307 is in service (HIFU[P]), while the other HIFU board 303 is at a standby state (HIFU [S]). In similar, a pair of HIFU boards 304 and 308 are connected to the OMM[S] 302. In the case of OMM[S] 302, the board 308 serves as the HIFU[P]board whereas the board 304 serves as the HIFU[S] board. With such a connection, the duplex OMS of the present invention has an ability to rapidly cope with any system fault.

The HIFU[P] boards and HIFU[S] boards branching from the OMMs 301 and 302 are connected to interface lines 305 and 306 branching from the target system, respectively. The OMM[P]301 and OMM[S] 302 are connected in common to a graphic alarm monitor 307 via a LAN such as RS-232C, to always achieve transmission and reception of messages with respect to the graphic alarm monitor 307.

Both the OMMs 301 and 302 are also connected to a remote SIGNOS system 308 by an X.25 network using a modem. Accordingly, it is possible to efficiently manage network resource and state of signalling networks.

Figure 4:
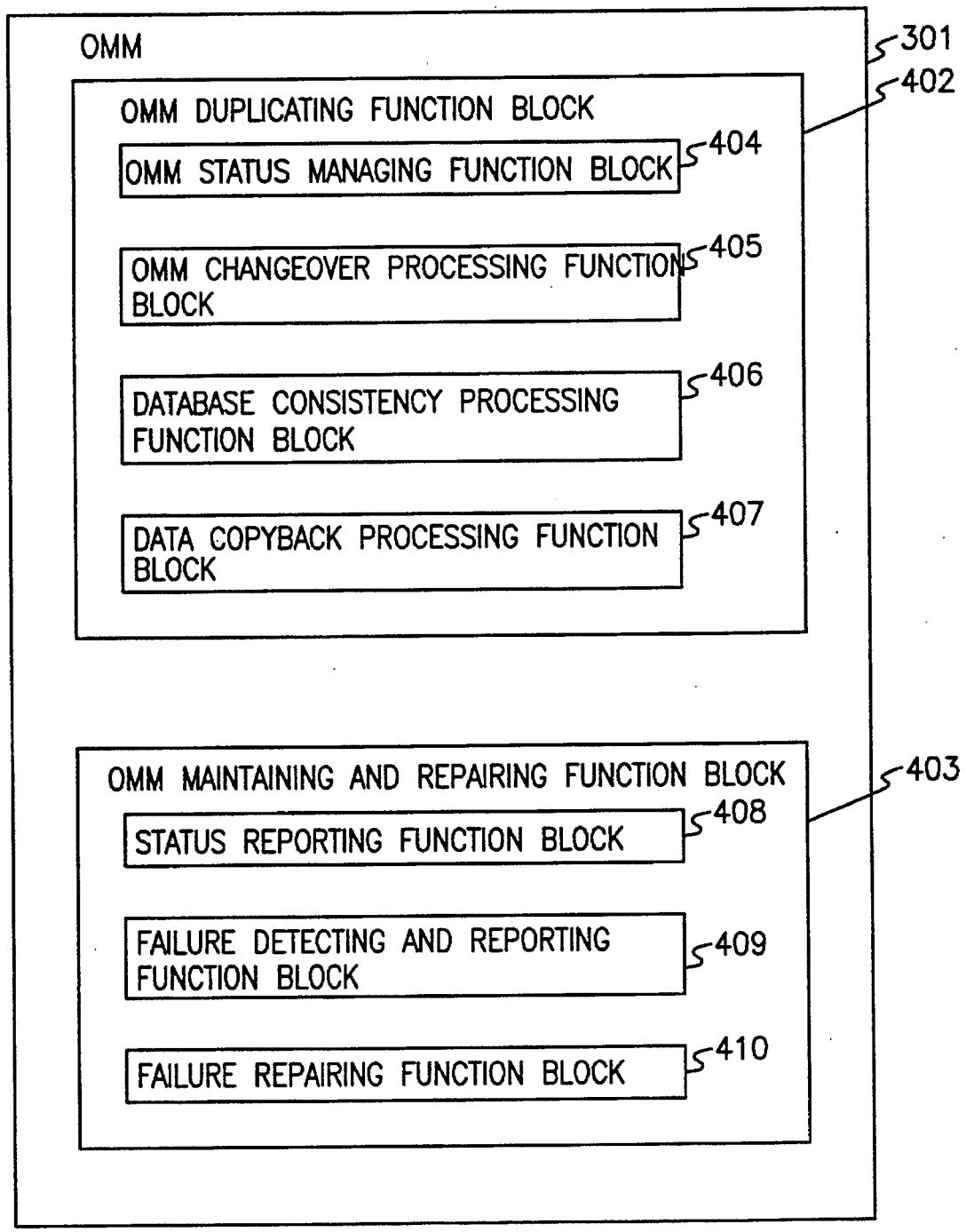
FIG. 4 is a block diagram illustrating function blocks of each OMS module (OMM) shown in FIG. 3.

FIG. 4 is a block diagram illustrating function blocks of each OMM shown in FIG. 3.

As shown in FIG. 4, each OMM 301 or 302 includes an OMM duplicating function block 402 and an OMM maintaining and repairing function block 403. The OMM duplicating function block 402 includes an OMM state managing function block 404, an OMM changeover processing function block 405, a database consistency processing function block 406 and a data copyback processing function block 407. On the other hand, the OMM maintaining and repairing function block 403 includes a state reporting function block 408, a failure detecting and reporting function block 409 and a failure repairing function block 410. Now, the above-mentioned function blocks will be described in detail.

OMM State Managing Function Block 404

This block 404 executes management for the operation state of the associated OMM. It determines flows of inputs received from the target system and user worksites in accordance with five transit states defined in FIGS. 5A and 5B.

OMM Changeover Processing Function Block 405

This block 405 executes a procedure for recovering functions of OMM when an OMM changeover occurs. It performs an operation for switching the standby OMM from a standby state to a in-service state. In other words, the block 405 executes operation for achieving the database consistency, buffering for on-occurrence messages (OOMs) generated during a failure recovery period, control for worksites, re-initialization of alarm screen, re-startup of the measurement and statistics function and setting of the operative connection to SIGNOS.

Database Consistency Processing Function Block 406

This block 406 operates to establish the database consistency between two OMMs. This database consistency is given for those of databases associated with the basic category of OMM duplicating design. In principle, this block 406 is applied only to addition and removal of tables associated with SIGNOS functions and the content of existing databases.

Data Copyback Processing Function Block 407

This block 407 extracts system status data and module management data from a signalling network management module (SNGTMM) in order to provide the consistency of various status data when the OMM changeover occurs.

Status Reporting Function Block 408

This block 408 executes a function to report the state of the OMM at the request of a global test and maintenance unit (GTMU) of the target system.

Failure Detecting and Reporting Function Block 409

This block 409 detects failures of essential modules of the OMM and reports them to the GTMU of the target system. Modules to be monitored by the block 409 include daemon processes, IPC, databases, target connection function and function of operative connection to SIGNOS.

Failure Repairing Function Block 410

This block 410 executes a function required to switch the failed OMM from the failed state to the standby state. This function means a repair function carried out by the user.

Figure 5A:
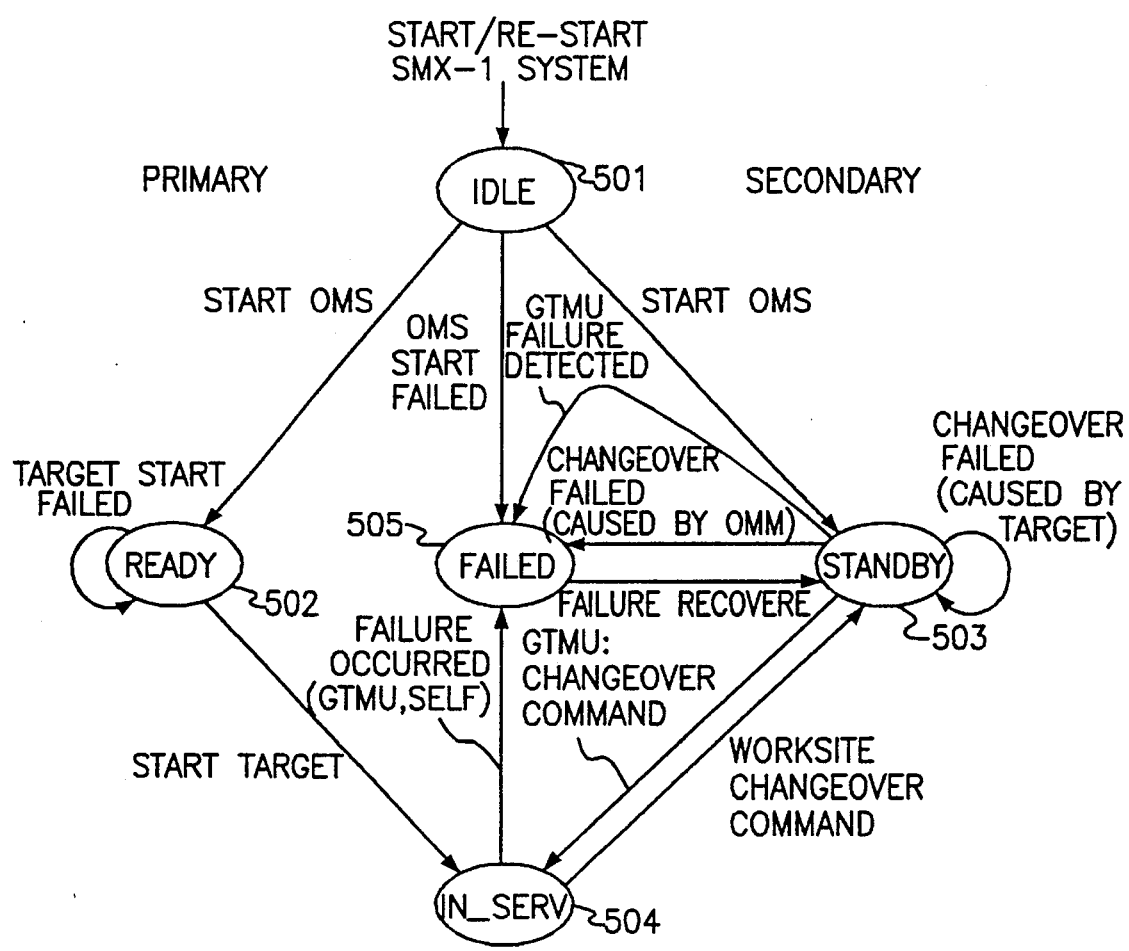
FIGS. 5A and 5B are flow charts respectively illustrating the entire state transit procedure executed by each OMM of FIG. 3.

FIG. 5A illustrates a state transit procedure executed by the OMMs of FIG. 3. In order to efficiently manage duplicated functions of the OMMs, each OMM have five transit states. These states of the OMM are differently defined from those used in the GTMU of the SMX-1 system because of functional and hardware peculiarities of the OMM. The five transit states as mentioned above are as follows:

Idle State (501)

This state 501 is the state that an operation work LOGO (initial screen) of the SMX-1 system is displayed under a condition that an operation management computer is booted only to execute a general computing function.

Ready State (502)

This state 502 is the state that execution of an OMM function is started by the user at the idle state 501. At this state 502, execution of the daemon processes of the OMM is begun. Initialization of databases is also carried out. At the state 502, accordingly, the OMM is at a state that it can be connected to the target system.

Standby State (503)

This state 503 is the state that initialization of the OMM has been made, that is, the state that the startup of the daemon processes and initialization of databases have been made. At this state 503, a changeover to an in-service state is possible to provide desired services. In response to a changeover command, this changeover is executed after recovery of databases and re-starting of environmental operations such as graphic alarm screen display, operative connection to SIGNOS, measurement processing, worksite processing and the like.

In-Service State (504)

This state 504 is the state that the overall function of the SMX-1 system is being executed without any trouble under a condition that downloading of target system programs and startup of the target system (for example, commands for blocking release and No. 7 startup) have been executed. In the in-service state 504, the OMM executes collecting and processing of state messages from the target system, processing of worksite commands and processing of SIGNOS commands in an event-driven fashion.

Failed State (505)

This state 505 is the state that a functional abnormality or failure occurs in the OMM, thereby disabling the OMM to normally execute its functions.

Figure 5B:
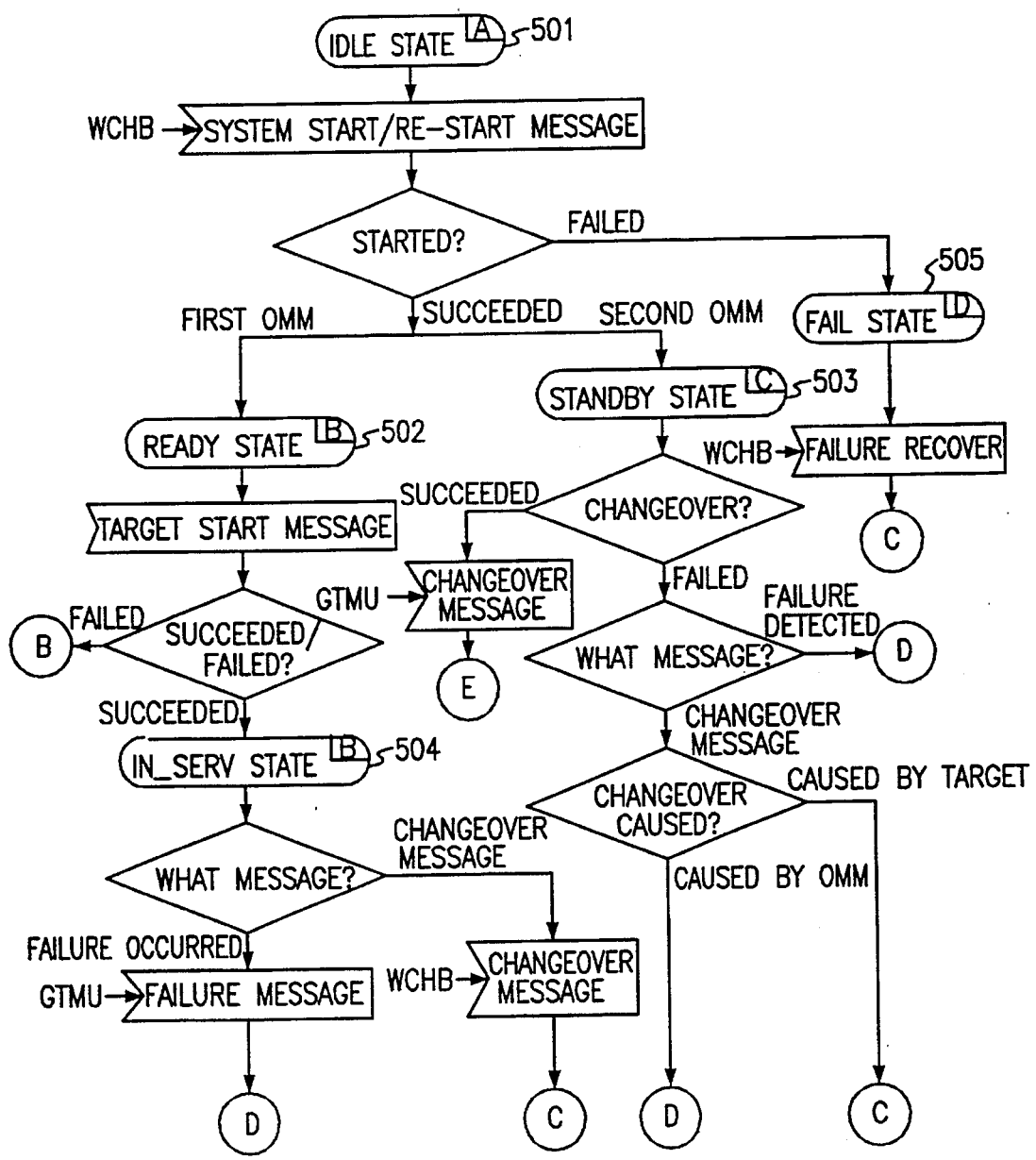

FIG. 5B illustrates a procedure of controlling the OMS depending on a state transit. This procedure will be described in detail in conjunction with FIGS. 6 to 9.

Figure 6:
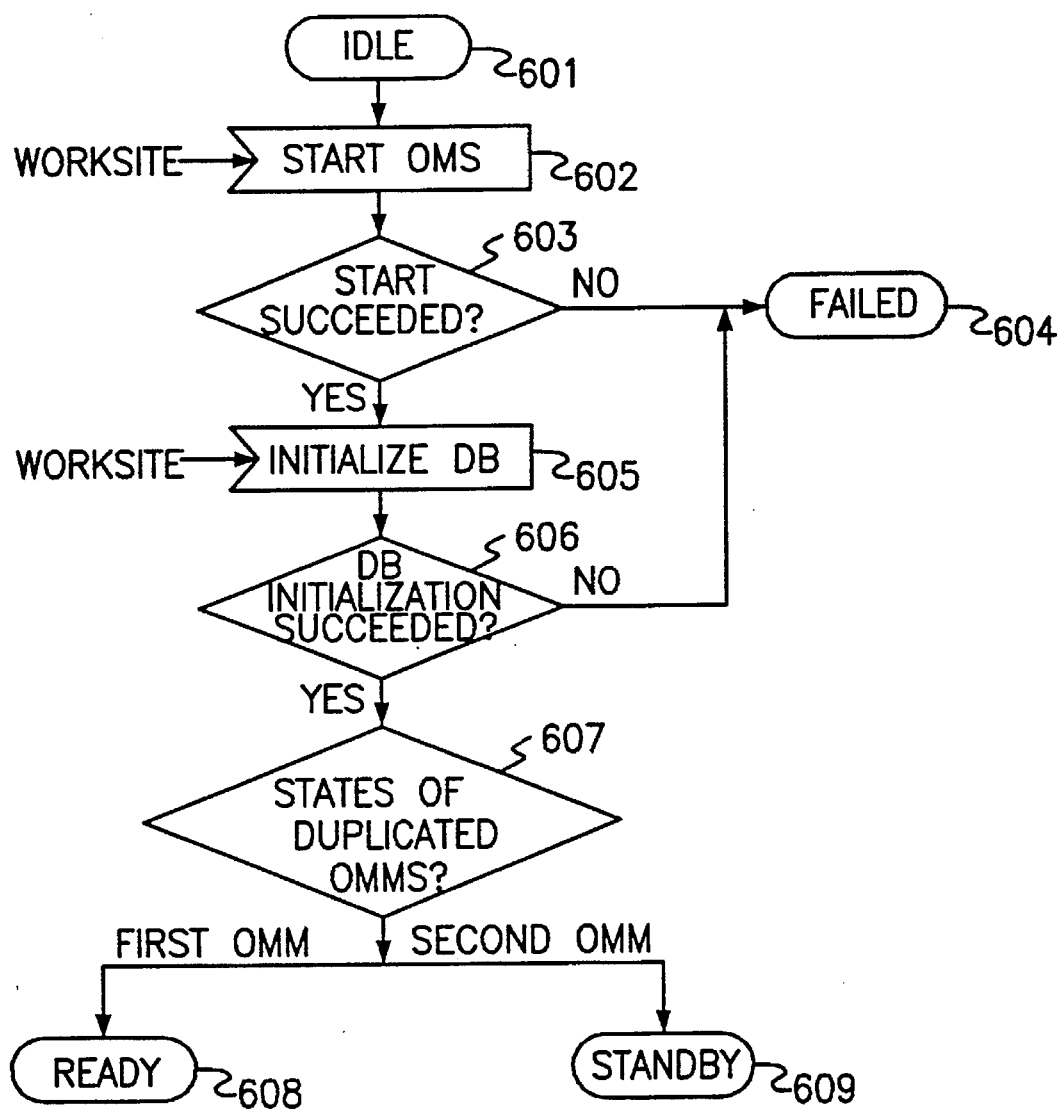
FIGS. 6 to 9 are flow charts respectively illustrating various state transit procedures executed in the OMM in conjunction with the entire state transit procedure of FIGS. 5A and 5B.

FIG. 6 is a flow chart illustrating a state transit procedure of the OMS from the idle state to the ready state or to the standby state.

Once power is supplied by the user to the OMS being at the idle state (Step 601) at the step 602, an initialization of databases is executed at the step 605 on the basis of whether or not the OMS has started up (Step 603).

After the initialization of databases is completed (Step 606), a determination is made about conditions of OMMs equipped in the duplex OMS (Step 607). One, being currently under a normal condition, of the OMMs is set as a currently operable, ready system (Step 608). The other OMM is set as a standby system (Step 609).

Figure 7:
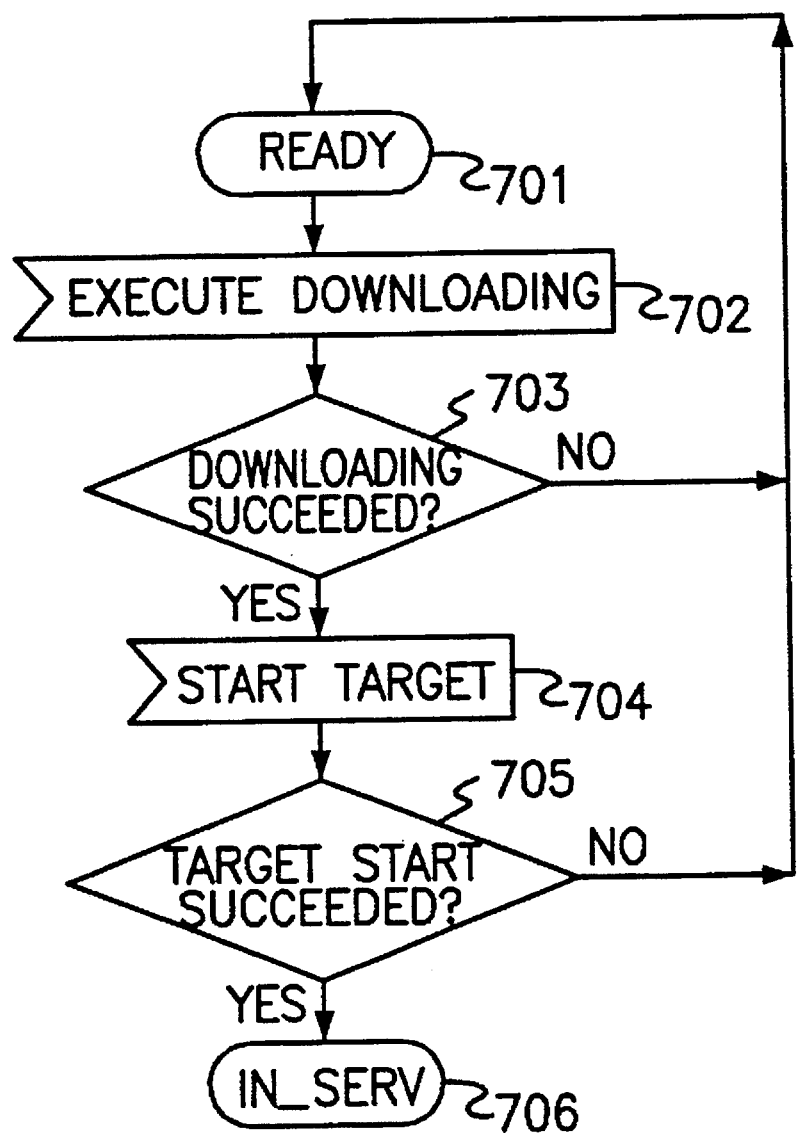

FIG. 7 is a flow chart illustrating a state transit procedure of the OMM from the ready state to the in-service state.

The OMM being at the ready state (Step 701) executes downloading of initial data to be used in the target system (Step 702). On the basis of whether the downloading of data has been succeeded or failed (Step 703), startup of the target system is executed at the step 704. After the startup of the target system is completed (Step 705), the OMM is switched to the in-service state (Step 706).

Figure 8:
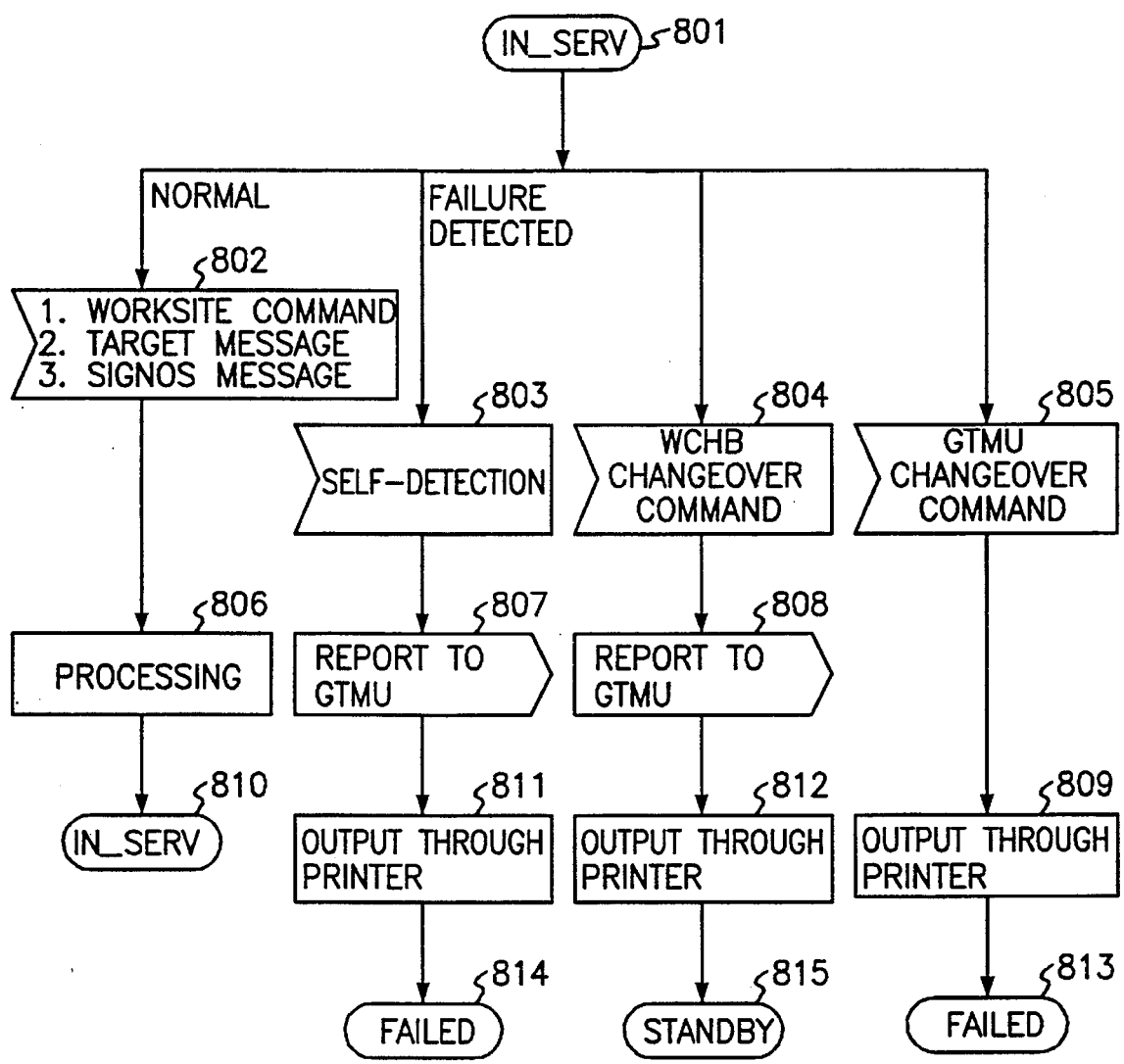

FIG. 8 is a flow chart illustrating a state transit procedure of the OMM from the in-service state to the failed state or to the standby state.

When the OMM being at the in-service state (Step 801) operates normally, it executes smoothly operations associated with interprocess communications(IPC) of worksite commands and target system messages and operative connection to SIGNOS (Step 802).

When a failure is found or detected, however, an action to deal with the failure should be made. Detection of the failure is achieved in different fashions, mainly for three cases.

Where the failure has been detected by the OMM itself (Step 803), it is immediately reported to the GTMU of the target system (Step 807) so that message associated therewith is outputted (Step 811). In this case, the system state is switched to the failed state (Step 814).

Where the OMM receives a command associated with a failure from a worksite such as workstation command handling block (WCHB), the OMM executes the same processing as that in the case that the OMM detects the failure by itself (Steps 808 and 812). In this case, the system state is transited to the standby state (Step 815).

Even though the OMM operates normally, an abnormal phenomenon may occur in the target system, namely, SMX-1 system. In this case, the GTMU of the target system outputs automatically message associated with the abnormality (Steps 805 and 809). The system state is then transited to the failed state (Step 813).

Figure 9:
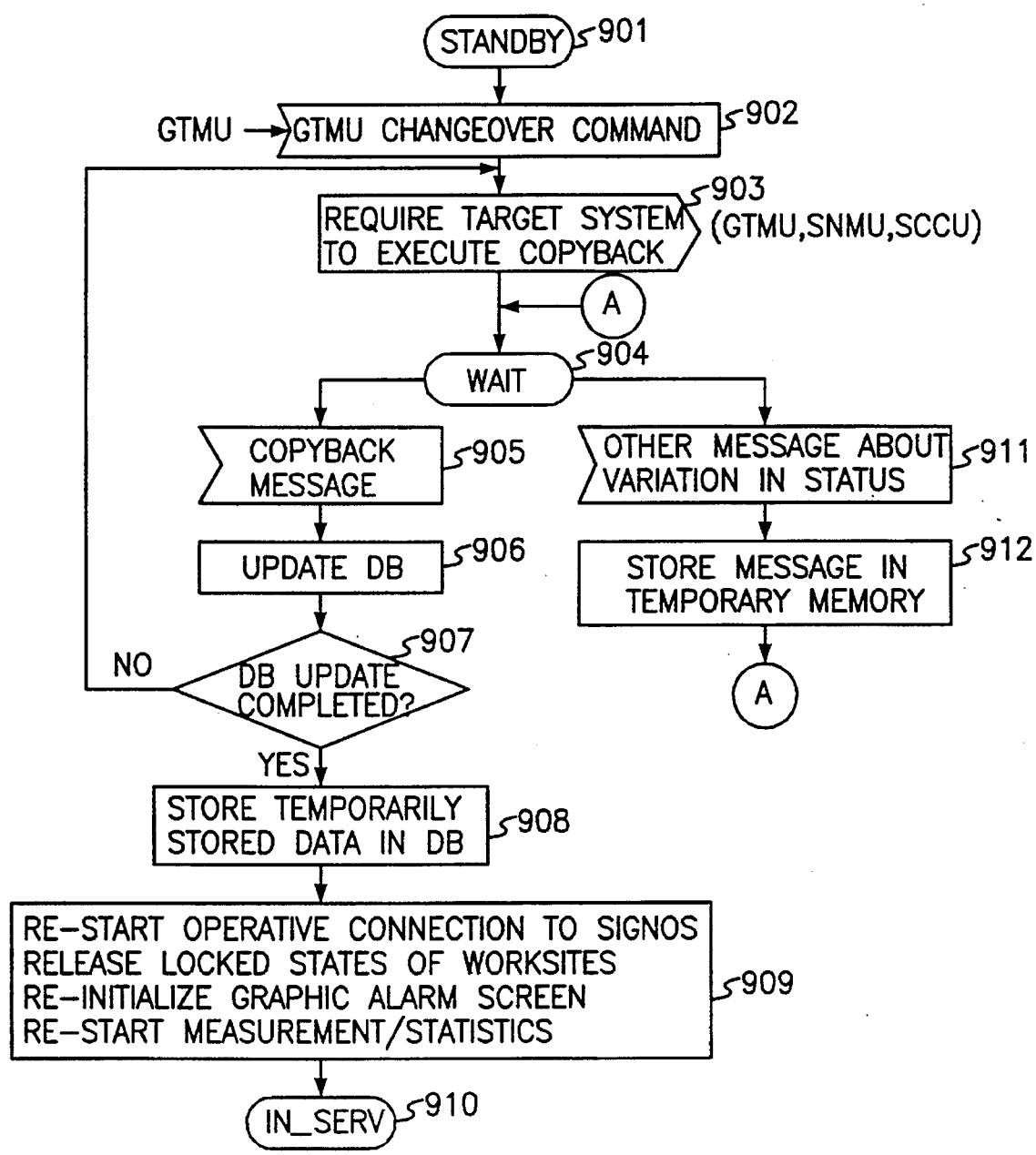

FIG. 9 is a flow chart illustrating a state transit procedure of the OMM from the standby state to the in-service state.

When the OMM being at the standby state (Step 901) receives a changeover command from the GTMU of the target system (Step 902), it requires the target system to execute copyback of system data associated with its GTMU, signalling network maintenance unit (SNMU) and signalling connection control unit (SCCU) (Step 903) and then waits until the copyback is completed (Step 904). If message about a variation in state is received in the OMM during the waiting (Step 911), it is stored in a temporary memory or buffer (Step 912). Generally, however, the OMM substitutes, namely, updates the contents of all databases thereof by data just previously used on the basis of copyback message generated at the step 905 (Step 906). After the contents of all databases is updated (Step 907), the temporarily stored data, namely, data to be finally updated is stored in the database associated therewith (Step 908). Thereafter, the OMM executes re-startup of the operative connection to SIGNOS, release of locked states of worksites, re-initialization of the graphic alarm screen and re-startup of measurement/statistics (Step 909). After completing the above procedure, the OMM is transited to the in-service state (Step 910).

Figure 10:
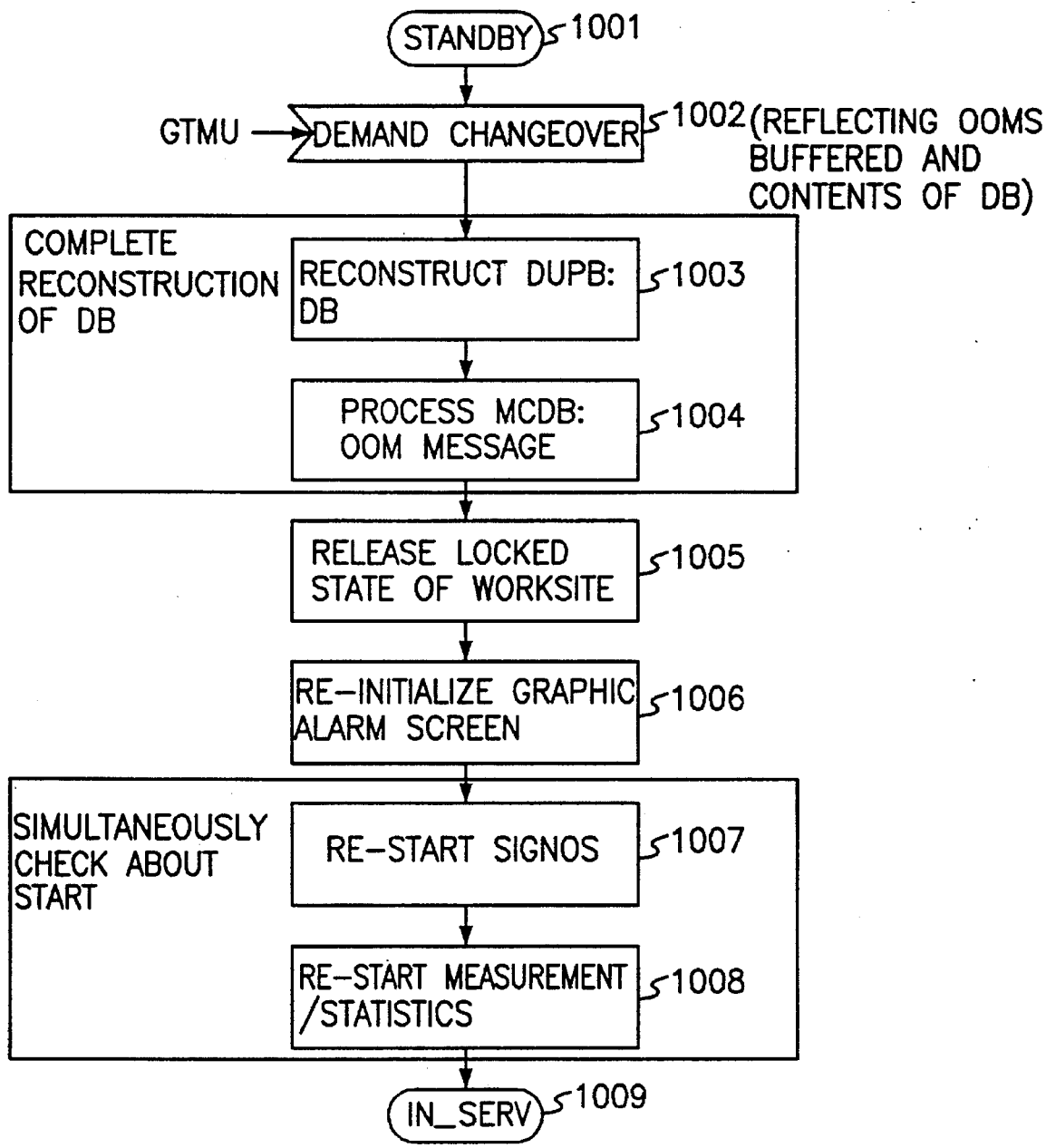
FIG. 10 is a flow chart illustrating a part of the state changeover procedure which is automatically executed in the OMM.

FIG. 10 is a flow chart illustrating a part of the state changeover procedure which is automatically executed in the OMM on the demand of the system.

When the OMM being at the standby state (Step 1001) receives a request for its state changeover from the GTMU of the target system (Step 1002), it executes re-construction of databases while reflecting OOMs buffered and the contents of databases therein (Steps 1003 and 1004). Thereafter, release of locked states of worksites (Step 1005) and reinitialization of the graphic alarm screen (Step 1006) are executed. After completing the re-initialization of the graphic alarm screen, re-startup of the SIGNOS (Step 1007) and re-startup of measurement/statistics (Step 1008) are executed. After completing the above procedure, the OMM is automatically transited to the in-service state (Step 1009).

Figure 11:
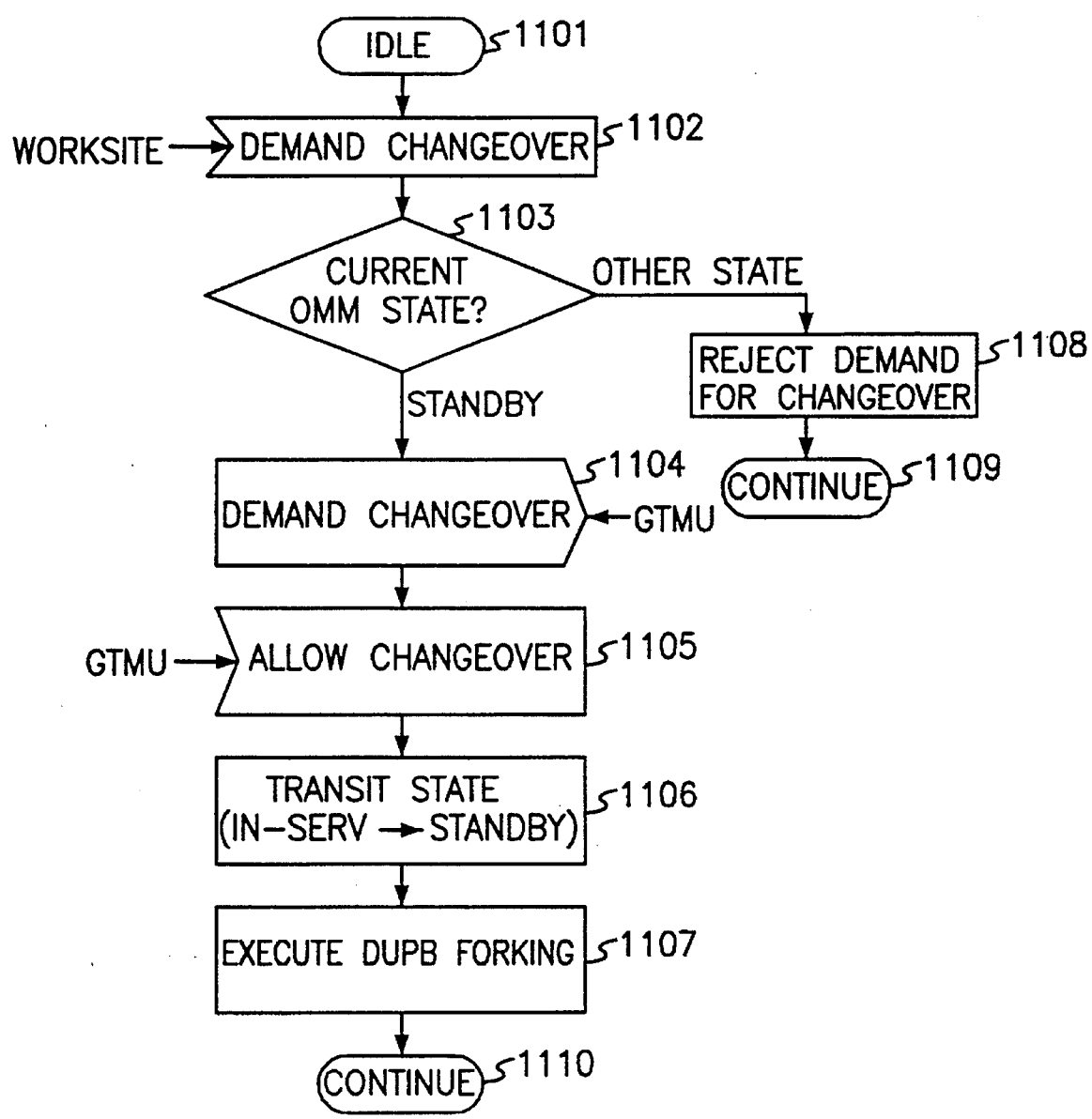
FIG. 11 is a flow chart illustrating a part of the state changeover procedure which is manually executed in the OMM.

FIG. 11 is a flow chart illustrating a part of the state changeover procedure which is manually executed in the OMM on the user's demand.

When the user keys command language for a changeover demand in the OMM being at the idle state (Step 1101) at the step 1102, the command language is sent to the GTMU of the target system depending on the current state of the OMM determined at the step 1103 (Step 1104) so that the state changeover procedure of OMM is immediately executed (Step 1105). As a result, the OMM is transited from the in-service state to the standby state (Step 1106). Thereafter, forking of a duplicating block (DUPB) of the OMM is executed (Step 1107). After completing the forking of DUPB, the procedure is returned to the initial step.

Where the user's demand for the state changeover can not be admitted due to the current state of the OMM (Step 1103), however, it is rejected for the global test and maintenance of the system (Step 1108). As a result, the procedure is returned to the initial step without executing the state changeover (Step 1109).

Figure 12:
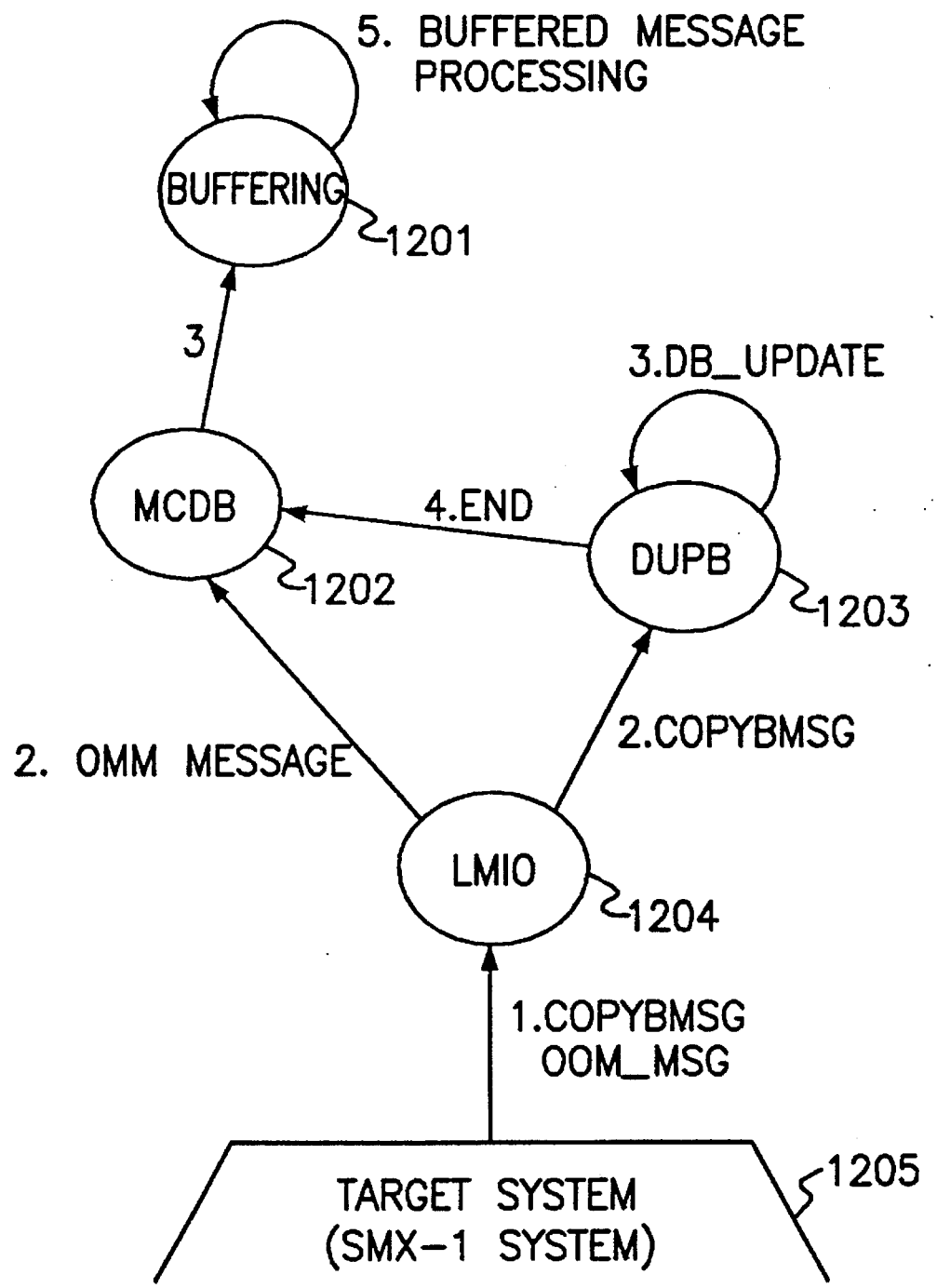
FIG. 12 is a flow chart illustrating a procedure for re-driving the environment of databases associated with the OMM.

FIG. 12 is a flow chart illustrating a procedure for re-driving the environment of databases associated with the OMM.

The most important function of the databases of OMM is to prevent the loss of data being currently used in the target system, namely SMX-1 system denoted by the reference numeral 1205 in FIG. 12. In this regard, all data existing in the OMM may be the set of data most recently used. To this end, a Low level protocol Message I/O (LMIO) process 1204 receives copyback messages and OMM messages from the SMX-1 system and then distributes them as follows:

The OMM messages are transferred to a message collection and distribution block (MCDB) process 1202 whereas the copyback messages are transferred to a DUPB process 1203. Based on the received message, the DUPB process 1203 updates immediately the content of databases. On the other hand, the MCDB process 1202 executes buffering of the OMM messages in a temporary memory 1201.

Figure 13:
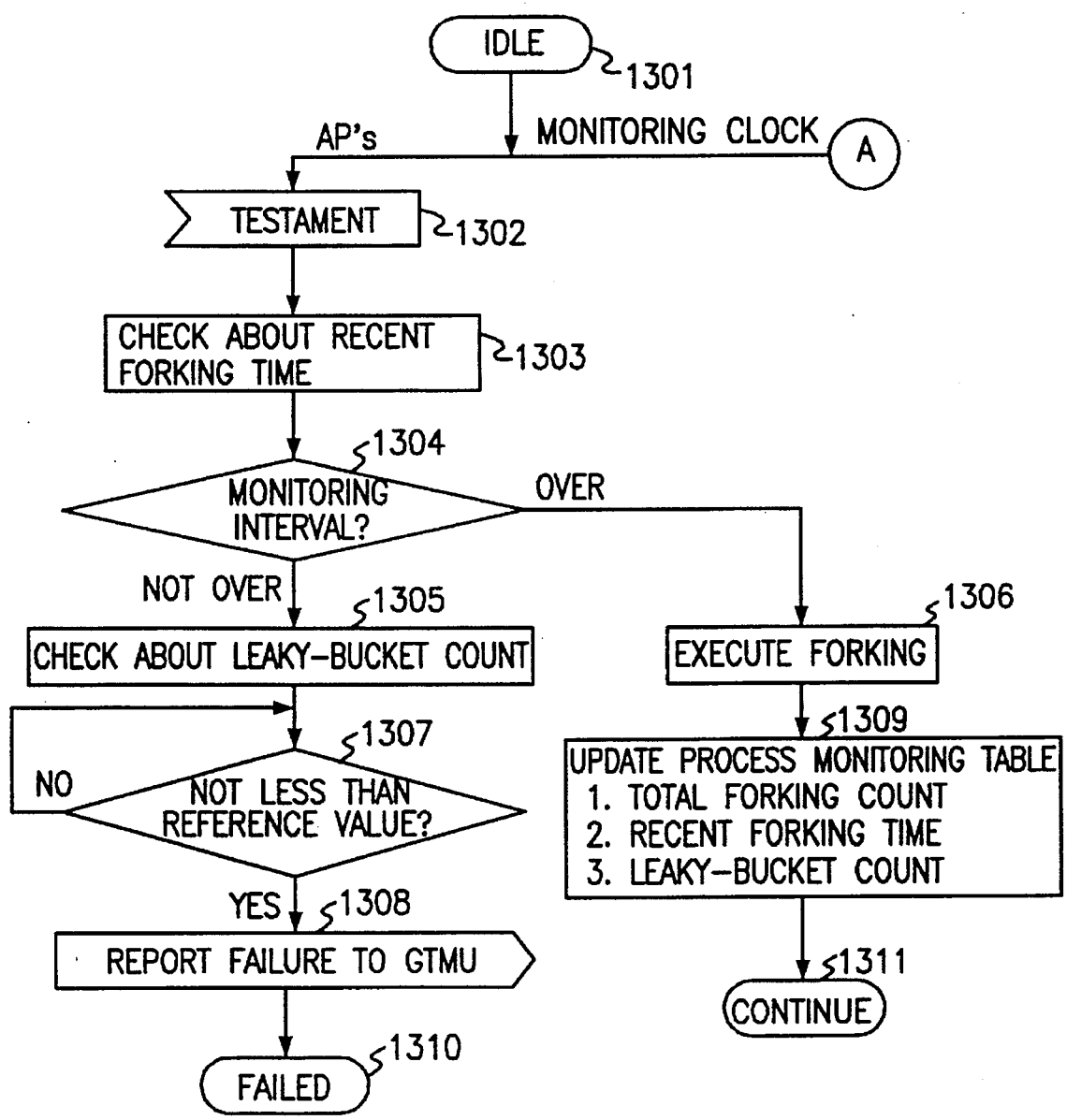
FIG. 13 is a flow chart illustrating a procedure for monitoring processes for ensuring the duplex function of OMM.

FIG. 13 is a flow chart illustrating a procedure for monitoring the current status of OMM.

The OMS should always monitor the current status of each process thereof for ensuring its duplex function. In order to monitor the status of OMM, the OMS uses two monitoring methods. One of the monitoring methods is to always monitor statuses of application processes being currently used, whereas the other monitoring method is to positively detect the current statuses of processes by monitoring clocks.

First, the method of monitoring the status of the application processes in the OMS will be described.

Every process, being in operation, in the OMM being at the idle state (Step 1301) leaves a testament in the form of a process identifier when it comes into an abnormal state or is failed during its execution (Step 1302). In response to the testament, the OMS checks the most recent forking time (Step 1303) and then checks the current monitoring interval (Step 1304). When the current monitoring interval has been over, that is, when the monitoring time at the current monitoring interval has elapsed, forking of application processes associated with the above process is executed again (Step 1306). Thereafter, monitoring tables of all processes associated with the forked application processes are updated (Step 1309 and 1311).

When the current monitoring interval has not been over yet, namely, when the monitoring time at the current monitoring interval has not elapsed yet, a check is made about leaky-bucket count (Step 1305) so that the leaky-bucket count is adjusted to be not less than a reference value (Step 1307). Thereafter, the failure is reported to the GTMU of the target system (Step 1308). The user is also informed of the failure of the system (Step 1310).

Now, the method of monitoring the status of each state using monitoring clocks will be described.

A check is made about whether or not the resource is useful, by allocating a monitoring clock to each of the processes being operated (Step 1313). Where the monitoring clock exists in the process (Step 1314), a check is made about whether or not the process is a halted one (Step 1315). If the process is normal (Step 1317), the OMM operates normally (Step 1318). If not, the OMM is transited to the failed state (Step 1312).

Where the existence of monitoring clock is unclear, however, an assumption is made that a system error has occur red (Step 1314). Thereafter, a check is made about whether the monitoring clock exists duplicatively in other process or whether no system error has occurred (Step 1320).

Where no system error has occurred (Step 1320), a check is made about the leaky-bucket count (Step 1326). Thereafter, a determination is made about whether or not the leaky-bucket count is not less than the reference value (Step 1327). When the leaky-bucket count is not less than the reference value, the failure is reported to the GTMU of the target system (Step 1324). The user is also informed of the failure of the system (Step 1325). When the leaky-bucket count is less than the reference value, forking of application processes associated with the above process is executed again (Step 1328). Thereafter, monitoring tables of all processes associated with the forked application processes are updated (Step 1329 and 1330).

On the other hand, where the monitoring clock exists duplicatively in other process (Step 1319), a determination is made about processes to be killed (Step 1321). At the step 1321, the determined processes are killed. Thereafter, the OMM is returned to its previous state (Step 1321) so that it operates normally (Step 1323).

As apparent from the above description, the present invention provides an apparatus for and a method of duplex operation and management for an SMX-1 system, capable of minimizing a failure of the system and ensuring the consistency of data between the contents of database and the data being currently operated by two OMMs operating in a fashion that when a failure occurs in one of the OMMs, the other OMM executes the function to be executed by the one OMM.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A duplex operation and management apparatus for a signalling message exchange No. 1 system, comprising a pair of duplicated operation management means both connected to a target system by highway interface unit means and connected to a remote signalling network operations system by transmission and reception means, one of said pair of duplicated operation management means being in service to execute a management of network resources and a management of states of signalling networks, while the other one of said pair of duplicated operation management means being standby, each of said pair of duplicated operation management means further comprising:
  a state managing function unit for managing an operation state of the operation management means;
  a changeover processing function unit for executing an operation to recover functions of the operation management means when a state changeover occurs in the operation management means;
  a database consistency processing function unit for executing an operation to establish a database consistency between the two operation management means;
  a data copyback processing function unit for extracting system state data and module management data from a signalling network management module, thereby providing the consistency of various state data when the state changeover occurs;
  a state reporting function unit for reporting a current state of the operation management means at the request of a global test and maintenance unit of the target system;
  a failure detecting and reporting function unit for detecting failures of essential modules of an operation maintenance means and reporting them to the global test and maintenance unit of the target system; and
  a failure repairing function unit for executing an operation required to transit the operation maintenance means from a failed state to a standby state.

2. A method for controlling a duplex operation and management subsystem in a signalling message exchange No. 1 (SMX-1) system, the subsystem including a pair of duplicated operation management means both connected to the target system by highway interface unit means and connected to a remote signalling network operations system by transmission and reception means, a first one of the operation management means being in-service to execute a management of network resources and a management of states of signalling networks, while the second operation management means being standby, comprising the steps of:

(a) starting up the operation and management subsystem being at an idle state when a message for starting up and restarting up the subsystem is outputted from a worksite, and then determining whether or not the subsystem has started up;

(b) transiting the subsystem to a failed state when the startup of the subsystem has been failed at the step (a), while transiting the first operation management means currently being at a normal state to a ready state and transiting the second operation management means to a standby state when the startup of the subsystem has been succeeded;

(c) operating the first operation and management means being at the ready state at the step (b) to startup the target system, and then transiting the first operation and management means to an in-service state when the startup of the target system has been succeeded, while transiting the first operation and management means to the ready state again when the startup of the target system has been failed;

(d) transiting the first operation and management means being at the in-service state at the step (c) to a failed state when the first operation and management means receives a failure message from a global test and maintenance unit of the target system, while transiting the first operation and management means to a standby state when the first operation and management means receives a state changeover message from the worksite;

(e) transiting the second operation and management means being at the standby state at the step (b) to an in-service state when the second operation and management means receives a state changeover message from the global test and maintenance unit of the target system, transiting the second operation and management means to a failed state when a failure is detected by the second operation and management means, and transiting the second operation and management means to the failed state when a changeover failure caused by the second operation and management means occurs, while transiting the second operation and management means to the standby state when a changeover failure caused by the target system occurs; and (f) transiting the subsystem being at the failed state at the step (b) to a standby state when the subsystem receives a failure recovery message from the worksite.

* * * * *